United States Patent
Blanka et al.

(10) Patent No.: US 9,026,068 B2
(45) Date of Patent: May 5, 2015

(54) TUNABLE SYSTEM AND METHOD FOR TUNING A SYSTEM

(71) Applicant: DSP Group LTD., Herzeliya (IL)

(72) Inventors: Lior Blanka, Rosh Haayin (IL); Solon Jose Spiegel, Tel Aviv (IL)

(73) Assignee: DSP Group Ltd., Herzeliya (IL)

( * ) Notice: Subject to any disclaimer, the term of this patent is extended or adjusted under 35 U.S.C. 154(b) by 0 days.

(21) Appl. No.: 13/902,998

(22) Filed: May 28, 2013

(65) Prior Publication Data
US 2014/0357205 A1 Dec. 4, 2014

(51) Int. Cl.
*H04B 1/04* (2006.01)
*H01Q 11/12* (2006.01)

(52) U.S. Cl.
CPC .................................. *H04B 1/0458* (2013.01)

(58) Field of Classification Search
CPC . H04B 1/0458; H04B 1/0475; H03J 2200/06; H03H 7/40; H04W 52/52
USPC ............. 455/107, 115.1, 120, 121, 123, 125, 455/126, 127.1, 127.2; 375/295
See application file for complete search history.

(56) References Cited

U.S. PATENT DOCUMENTS

| | | | | |
|---|---|---|---|---|
| 5,334,945 | A * | 8/1994 | Yokoya et al. | 455/127.2 |
| 6,868,260 | B2 * | 3/2005 | Jagielski et al. | 455/107 |
| 7,084,704 | B2 * | 8/2006 | Sowlati | 330/253 |
| 8,014,737 | B2 * | 9/2011 | Pratt et al. | 455/127.1 |
| 8,131,232 | B2 * | 3/2012 | Muhammad | 455/127.2 |
| 8,320,850 | B1 * | 11/2012 | Khlat | 455/107 |

* cited by examiner

Primary Examiner — Quochien B Vuong
(74) Attorney, Agent, or Firm — Oren Reches (57) ABSTRACT

There is provided a system that includes a tunable amplification module, a coupler, an interface module; a detector that is arranged to output an impedance indicative signal and a power indicative signal; wherein the impedance indicative signal is indicative of an impedance mismatch between an output impedance of the tunable amplification module and an impedance of a radio frequency (RF) antenna as seen by the tunable amplification module, wherein the power indicative signal is indicative of an output power of the tunable amplification module.

21 Claims, 8 Drawing Sheets

TUNABLE SYSTEM AND METHOD FOR TUNING A SYSTEM

FIELD OF THE INVENTION

The present invention relates to antenna impedance matching of radio frequency (RF) transmission systems.

BACKGROUND OF THE INVENTION

Systems that transmit RF signals usually include an amplifier, followed by some passive structures as filters and switches that is connected via a matching network to an RF antenna. The impedances of the RF antenna and the amplifier should be matched and usually about fifty Ohms in order to optimize the transmission of RF signals via the RF antenna and minimize the voltage standing wave ratio (VSWR) at the RF antenna.

On the other hand the impedance of the amplifier should be optimized so that the amplifier maintains a constant output power at the highest possible power efficiency.

These sometime contradicting linearity and power efficiency demands are hard to fulfill.

There is a growing need to provide system and method for tuning in an efficient manner RF systems in order to maintain the delivered power at the antenna constant regardless the antenna impedance variations.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

SUMMARY

According to an embodiment of the invention there may be provided a system that may include a tunable amplification module that may be arranged to amplify an input signal for providing an incident signal; wherein the tunable amplification module has an output port for outputting the incident signal, an input port for receiving the input signal and a control input for receiving an amplification module tuning signal for tuning the amplification factor of the tunable amplification module; a coupler that may be arranged to output a first signal that represents the incident signal and a second signal that represents a reflected signal; an interface module; a detector that may be arranged to receive the first and second signals and to output an impedance indicative signal and a power indicative signal; wherein the impedance indicative signal is indicative of an impedance mismatch between an output impedance of the tunable amplification module and an impedance of a radio frequency (RF) antenna as seen by the tunable amplification module, wherein the power indicative signal is indicative of an output power of the tunable amplification module; wherein the interface module may be arranged to receive an interface module tuning signal and to set an impedance of the interface module in response to the interface module tuning signal; and a control module that may be arranged to generate the amplification module tuning signal and the interface module tuning signal in response to the impedance indicative signal and the power indicative signal; wherein control module may be arranged to set the amplification module tuning signal to maintain a substantially constant output power level of the tunable amplification module regardless of changes in an impedance of the RF antenna; and wherein the control module may be arranged to set the interface module tuning signal to compensate for the impedance mismatch.

The control module may be arranged to generate the amplification module tuning signal independently from the interface module tuning signal.

The control module may include a first control circuit that may be arranged to generate the interface module tuning signal in response to the impedance indicative signal; and a second control circuit that may be arranged to generate the amplification module tuning signal in response to the power indicative signal.

The first control circuit is an integrator.

The second control circuit may include a low pass filter.

The detector may include an impedance indicative signal circuit and a power indicative signal circuit; the impedance indicative signal circuit and the power indicative signal circuit share multiple components.

The impedance indicative signal is sent to a first loop and the power indicative signal is sent to a second loop; the first and second loop may be are mutually independent.

The detector may be a phase and amplitude detector; the impedance indicative signal may be a phase signal and the power indicative signal may be an amplitude signal; the phase signal is indicative of a an imaginary part of the impedance of the radio frequency (RF) antenna and the amplitude signal is indicative of an amplitude of at least the amplified signal.

The detector may include a first piecewise log detector, a second piecewise log detector and an output circuit coupled to the first and second piecewise log detectors.

The first piecewise detector may be arranged to receive the first signal and to output a first intermediate signal that provides an approximation of a logarithm of the first signal; the second piecewise detector may be arranged to receive the second signal and to output a second intermediate signal that provides an approximation of a logarithm of the second signal; the output circuit may be arranged to process the first and second intermediate signals to provide the phase signal and the amplitude signal.

The first piecewise log detector may include a first sequence of limiters that may be arranged to receive the first signal and to output a third intermediate signal; the second piecewise log detector may include a second sequence of limiters that may be arranged to receive the second signal and to output a fourth intermediate signal; and the output circuit may include a multiplier that may be arranged to multiply the third and fourth intermediate signals to provide the phase signal.

The detector may include a first piecewise log detector, a limiter and an output circuit; the first piecewise log detector may be arranged to process the first signal to provide a first and second intermediate signals; the limiter may be arranged to receive the second signals and output a fourth intermediate signal; the output circuit may be arranged to receive the first, second and fourth intermediate signals and output the signals.

The first piecewise log detector may include a first sequence of limiters that may be arranged to receive the first signal and to output a third intermediate signal; and the output circuit may include a multiplier that may be arranged to multiply the third and fourth intermediate signals to provide a phase signal.

The detector may be arranged to generate the power indicative signal in response to the first and second signals.

There may be provided, according to an embodiment of the invention, a method for tuning a system, the method may include: amplifying an input signal by a tunable amplification module to provide an incident signal; the tunable amplification module has an output port for outputting the incident signal; outputting, by a coupler, a first signal that represents the incident signal and a second signal that represents a reflected signal; receiving, by a detector, the first and second signals and outputting an impedance indicative signal and a power indicative signal; the impedance indicative signal is indicative of an impedance mismatch between an output impedance of the tunable amplification module and an impedance of a radio frequency (RF) antenna as seen by the tunable amplification module, the power indicative signal is indicative of an output power of the tunable amplification module; generating, by a control module, an amplification module tuning signal and an interface module tuning signal in response to the impedance indicative signal and the power indicative signal; amplification module tuning signal is set to maintain a substantially constant output power level of the tunable amplification module regardless of changes in an impedance of the RF antenna and the interface module tuning signal is set to compensate for the impedance mismatch; receiving by an interface module the interface module tuning signal and setting an impedance of the interface module in response to the interface module tuning signal; and receiving by the tunable amplification module the amplification module tuning signal and tuning an amplification factor of the tunable amplification module in response to the amplification module tuning signal.

DETAILED DESCRIPTION OF THE PRESENT INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

Because the illustrated embodiments of the present invention may for the most part, be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

Any reference in the specification to a method should be applied mutatis mutandis to a system capable of executing the method and should be applied mutatis mutandis to a non-transitory computer readable medium that stores instructions that once executed by a computer result in the execution of the method.

Any reference in the specification to a system should be applied mutatis mutandis to a method that may be executed by the system and should be applied mutatis mutandis to a non-transitory computer readable medium that stores instructions that may be executed by the system.

According to an embodiment of the invention there is provided a system that includes a tunable amplification module, a coupler, an interface module, a detector and a control module. The system may use a single detector while having independent feedback loops—one for maintaining the average output power delivered by a tunable amplifier module substantially constant (for example with deviations up to 5%, 10%, 15%, 20% and the like) and another for performing antenna impedance mismatch compensation.

The tunable amplification module may be arranged to amplify an input signal for providing an amplified signal; wherein the tunable amplification module has an output port for outputting the amplified signal, an input port for receiving the input RF signal and a control input for receiving an tuning signal with the purpose of controlling the output power of the tunable amplification module.

The coupler is coupled to the output port and may be arranged to output a first signal that represents the incident signal (from the tunable amplification module) and a second signal that represents a reflected signal (from the RF antenna).

The interface module is coupled between the output port of the tunable amplification module and an input port of the RF antenna.

The detector may be arranged to receive the first and second signals and to output an impedance indicative signal and a power indicative signal. The impedance indicative signal is indicative of an impedance mismatch between an output impedance of the tunable amplification module and an impedance of the RF antenna as seen by the tunable amplification module. The power indicative signal is indicative of an output power of the tunable amplification module.

The interface module may be arranged to receive an interface module tuning signal and to set an impedance of the interface module in response to the interface module tuning signal. It may include components (such as one or more capacitors, one or more coils) that may change their impedance—especially their imaginary impedance.

The control module may be arranged to generate the amplification module tuning signal and the interface module tuning signal in response to the impedance indicative signal and the power indicative signal. The control module may be arranged to set the amplification module tuning signal to maintain a substantially constant output power level of the tunable amplification module regardless of changes in an impedance of the RF antenna. The control module may be arranged to set the interface module tuning signal to compensate for the impedance mismatch.

According to an embodiment of the invention the impedance matching involves compensating for imaginary impedance mismatches—although the system can also apply real impedance matching techniques.

According to an embodiment of the invention the impedance mismatch is detected by detecting the phase difference between the amplified signal and the reflected signal. Hence—the detector can be a phase and impedance detector that outputs an impedance indicative signal that is a phase signal. For simplicity of explanation is also assumed that the power indicative signal is an amplitude signal. The phase signal is indicative of a an imaginary part of the impedance of the radio frequency (RF) antenna and the amplitude signal is indicative of an amplitude of at least the amplified signal. It is noted that the detection of the impedance mismatch and/or the detection of the output power of the tunable amplification module can be made in other manners. Thus, the reference to a phase and amplitude detector, phase signal and amplitude signals are made for convenience of explanation only.

Figure 1:
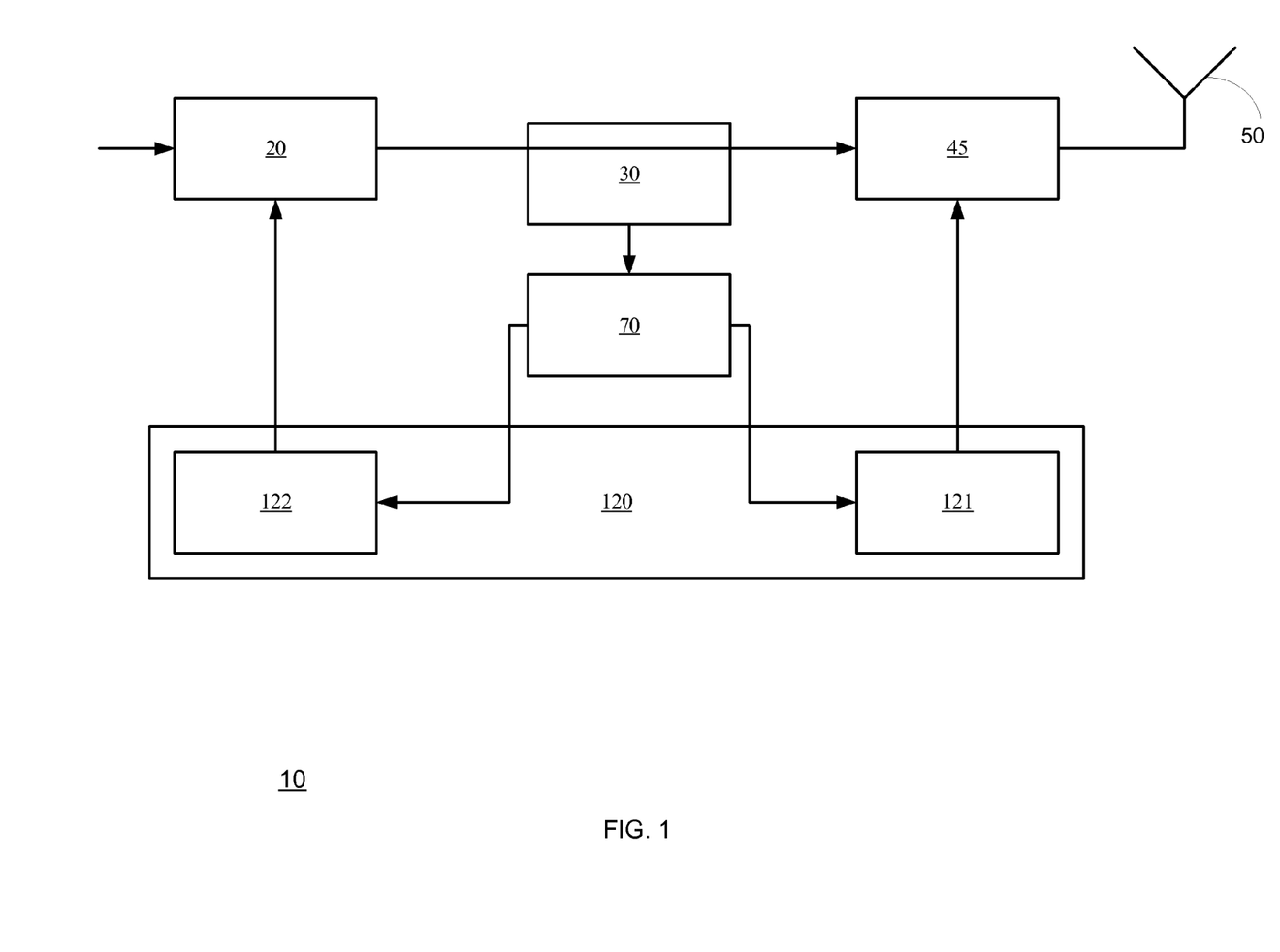
FIG. 1 is a schematic illustration of system according to an embodiment of the invention.
Figure 2:
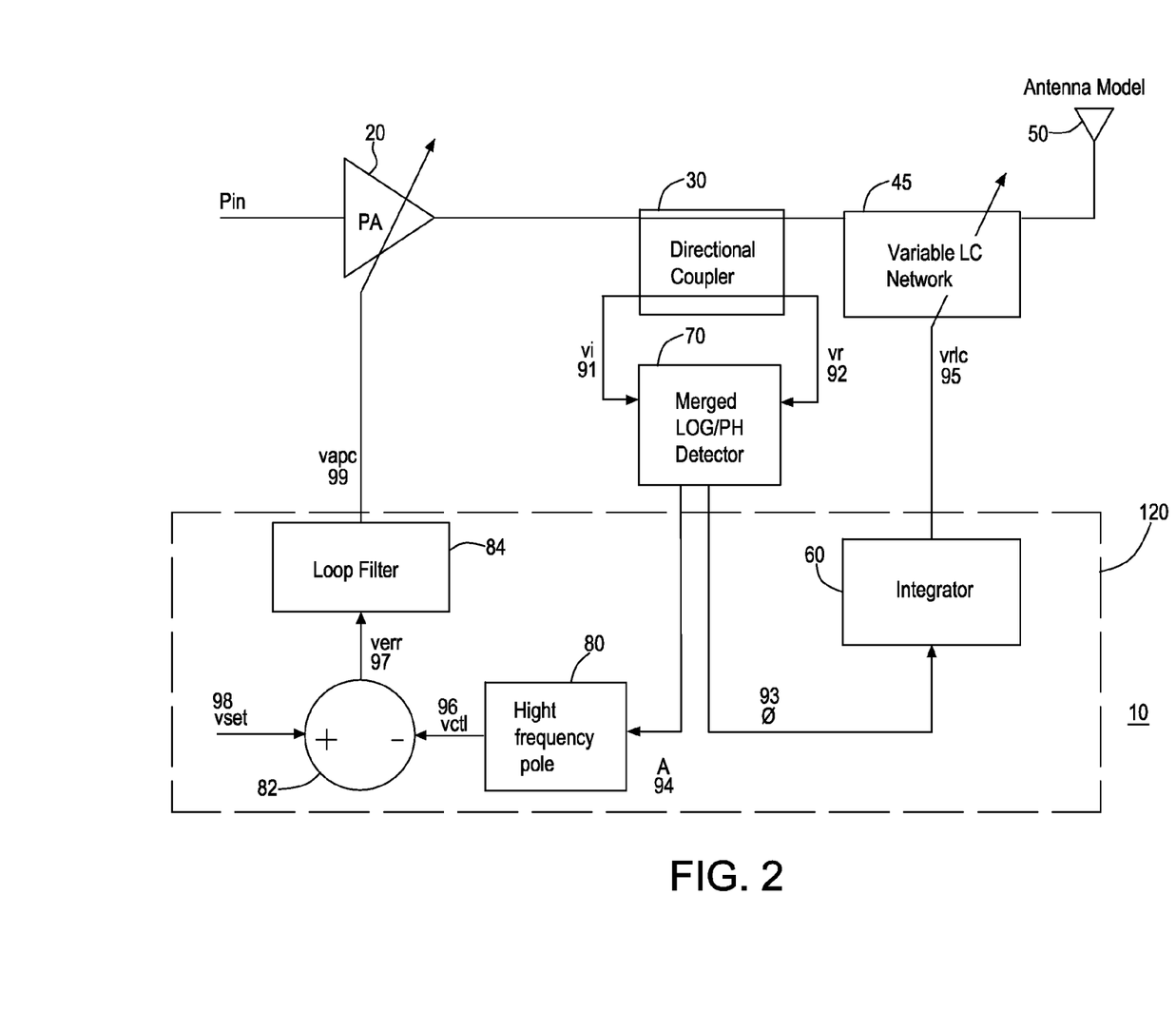
FIG. 2 is a schematic illustration of system according to an embodiment of the invention.

FIGS. 1 and 2 illustrate system 10 according to an embodiment of the invention.

System 10 includes the following components: tunable amplification module 20, coupler 30, phase and amplitude detector 70, interface module 45 and control module 120. System 10 can include RF antenna 50 or be connected to the RF antenna 50. It is noted that the components illustrated in FIGS. 1 and 2 can be arranged in a different manner than those illustrated in these figures. For example—the interface module 45 can be connected between the tunable amplification module 20 and the coupler 30.

The tunable amplification module 20 may be arranged to amplify an input signal for providing an amplified signal. The tunable amplification module has an output port for outputting the amplified signal, an input port for receiving the input signal and a control input for receiving an amplification module tuning signal for controlling the average output power.

The coupler 30 is coupled to the output port of the tunable amplification module 20. The coupler is arranged to output a first signal that represents the incident signal (the amplified signal) and a second signal that represents a reflected signal.

The phase and amplitude detector (referred to as merged LOG/PH detector in FIG. 2) 70 may be arranged to receive the first and second signals and to output an impedance indicative signals such as a phase signal and a power indicative signal such as an amplitude signal.

The phase signal is indicative of an impedance mismatch between an output impedance of the tunable amplification module and an impedance of the radio frequency (RF) antenna as seen by the tunable amplification module (it may, for example represent the phase mismatch between the amplified signal and the reflected signal), and the amplitude signal wherein the power indicative signal is indicative of an output power of the tunable amplification module.

The interface module (referred to as variable LC network in FIG. 2) 45 is coupled between the output port of the tunable amplification module and an input port of the RF antenna. The interface module is arranged to receive an interface module tuning signal and to set an impedance of the interface module in response to the interface module tuning signal.

The control module 120 may be arranged to generate the amplification module tuning signal and the interface module tuning signal in response to the phase signal and the amplitude signal.

The control module 120 may be arranged to set the amplification module tuning signal to maintain a substantially constant output power level of the tunable amplification module regardless of changes in an impedance of the RF antenna. The control module 120 may be arranged to set the interface module tuning signal to compensate for the impedance mismatch.

The control module 120 may include a first control circuit 121 that is arranged to generate the interface module tuning signal in response to the phase signal and a second control circuit 122 that is arranged to generate the amplification module tuning signal in response to the amplitude signal. In FIG. 2 the first control circuit 121 includes integrator 60. In FIG. 2 the second control circuit 122 includes high frequency pole (low pass or band-pass filter) 80, subtraction unit 82 and loop filter 84.

The amplification module tuning signal and the interface module tuning signal may be generated independently from each other.

The matching may include altering the complex impedance of the interface module 45—and especially altering its imaginary impedance.

In FIG. 2 the control module 120 is illustrated as including integrator 60, high frequency pole 80, subtracting unit 82 and loop filter 84. Integrator 60 is connected between the phase and amplitude detector 70 and variable LC network 45. High frequency pole 80 is connected between phase and amplitude detector 70 and subtracting unit 82—that generates an error signal indicative of a difference between a desired output power of the tunable amplification module (indicated by Vset) and the actual output power. Loop filter 82 is connected between the subtracting unit 82 and the tunable amplification module 20.

FIG. 2 also illustrates various signals—incident signal (vi) 91, reflected signal (vr) 92, amplitude signal (A) 94, phase signal ($\Phi$) 93, interface module tuning signal (vrlc) 95 (outputted from integrator 60), amplification module tuning signal (vapc) 99, and second control circuit intermediate signals—vctl 96 (outputted from high frequency pole 80 and is indicative of the actual output power), vset 98 (fed to subtracting unit 82 and is set to a value that corresponds to a desire output power), and verr 97 (outputted from the subtracting unit 82 and equals vctl 96 minus vset 98).

According to various embodiments of the invention the detector generates an impedance indicative signal, which represents a phase signal performs only reactance matching. As a result, only the sign information is required as the algorithm converges iteratively. Assuming that in the antenna matching condition the reactance part of the impedance ought to be zero, the mismatch control loop can be further simplified as indicated in FIG. 2 where the desired reactance value is set to zero. Setting the desired reactance to zero indicates that the detector 70 is connected directly to the integrator 60 as shown in FIG. 2.

The impedance detector can be simplified to a phase detector with quadrature input signals where the output is expressed as:

$$\phi = \text{sign}\left(v_i e^{j\frac{\theta}{2}}\right)\text{sign}(vr);$$

Wherein Φ is the phase signal 93, vi is the incidence signal 91 and vr is the reflected signal 92 and θ represents the quadrature phase shift applied to the incident wave.

Figure 6:
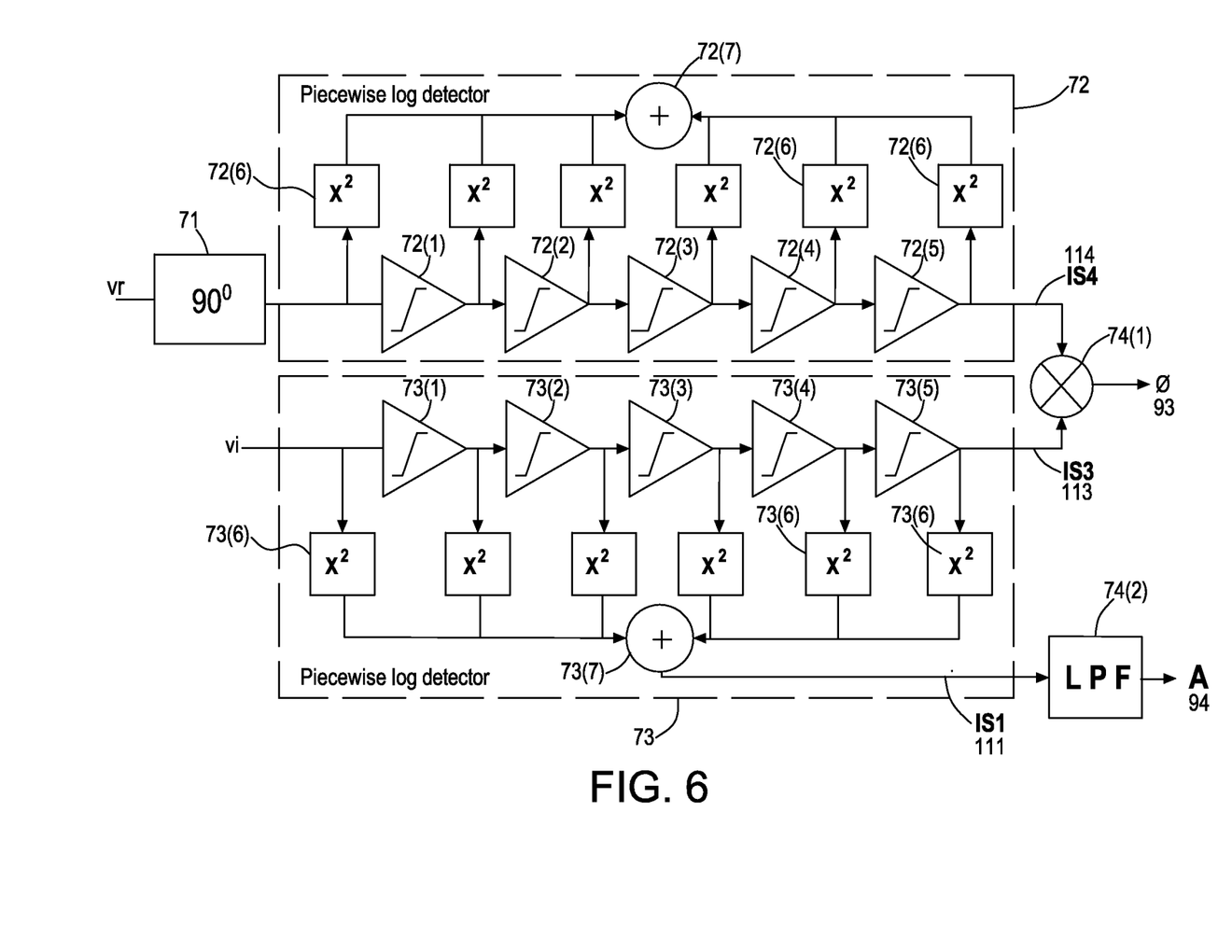
FIG. 6 illustrates a phase and amplitude detector according to an embodiment of the invention.
Figure 7:
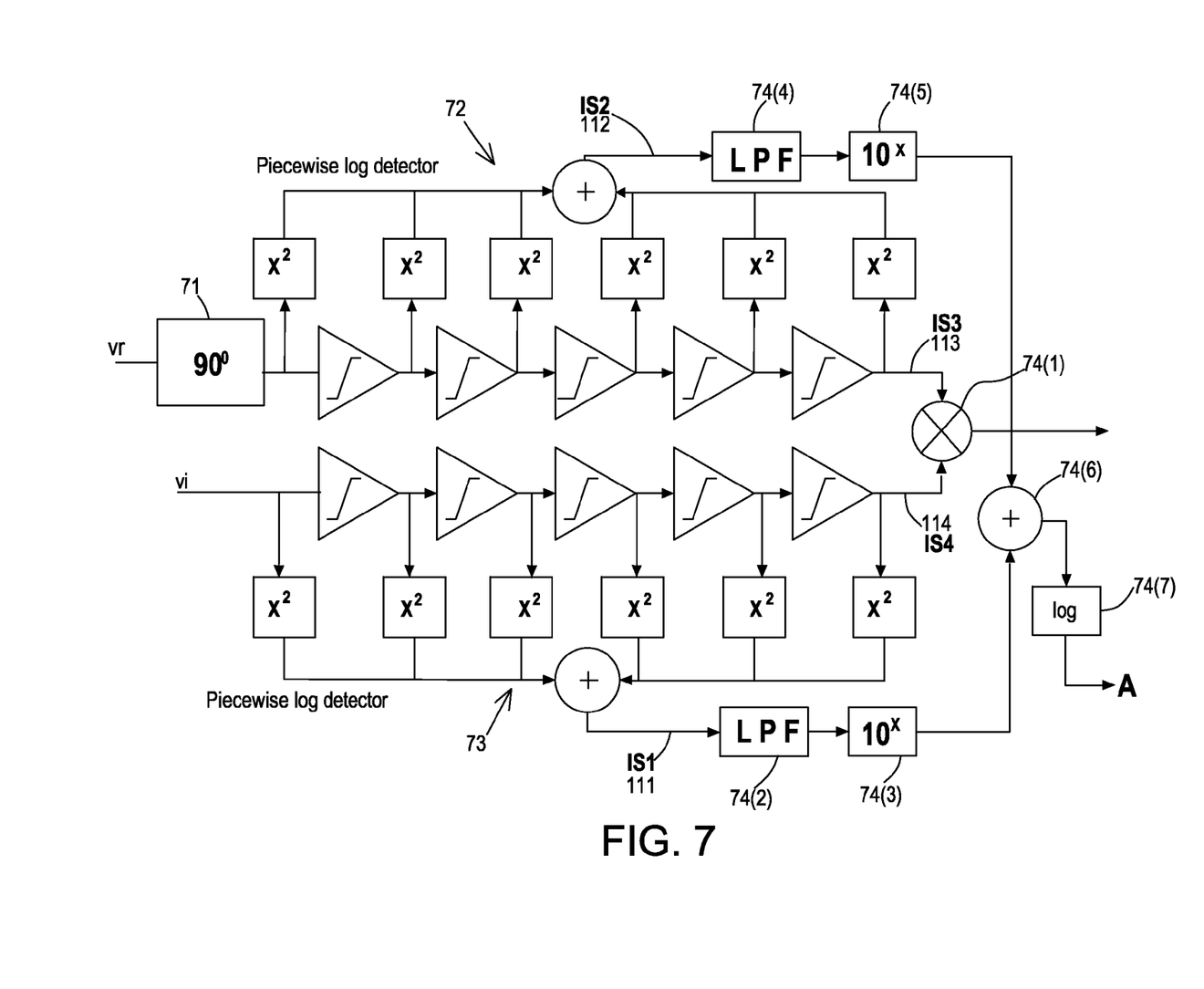
FIG. 7 illustrates a phase and amplitude detector according to an embodiment of the invention.

The amplitude signal A 94 can be expressed by the following equation:

$$A = \log(k_1 |V_{in}|)$$

Wherein A is the amplitude signal 94 and Vin is either vi (FIG. 6) or is equals (as illustrated in FIG. 7) |vi+jvr| and $k_1$ is a gain factor associated with the logarithmic detector. The amplitude signal 94 is applied to units 80, 82 and 84 to produce the control voltage 99. The unit 80 of FIG. 2 reduces the ripple component associated with the amplitude signal 94, by removing the high frequency components.

The interface module tuning signal (vrlc) 95 can be expressed by the following equation:

$$vrlc = k_2 \int \left[\text{sign}\left(v_i e^{j\frac{\theta}{2}}\right)\text{sign}(vr)\right] dt$$

Wherein $k_2$ represents the gain factor of the integrator unit.

Figure 3:
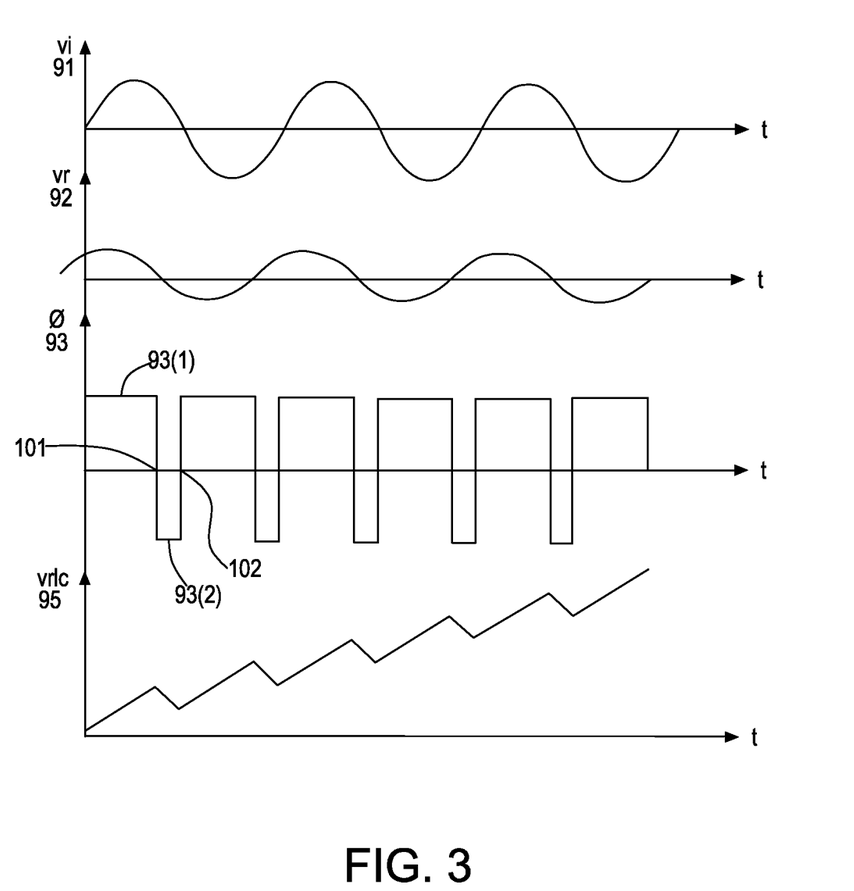
FIG. 3 is timing diagram that shows various signals of the system according to an embodiment of the invention.

FIG. 3 is a timing diagram that illustrates various signals of the system of FIG. 2, according to an embodiment of the invention.

FIG. 3 illustrates first signal (vi) 91 and second signal (vr) 92 as being phase shifted from each other and having a sinusoidal shape. Phase signal (Φ) 93 has a negative value (93(2)) when vi 91 is positive while vr 92 is negative. Phase signal (Φ) 93 has a positive value (93(1)) in other cases.

Interface module tuning signal (vrlc) 95 increases while the phase signal (Φ) 93 has a positive value and decreases while the phase signal (Φ) 93 has a negative value. In most of the time the phase signal (Φ) 93 is positive and the interface module tuning signal (vrlc) 95 increases over time.

Figure 4:
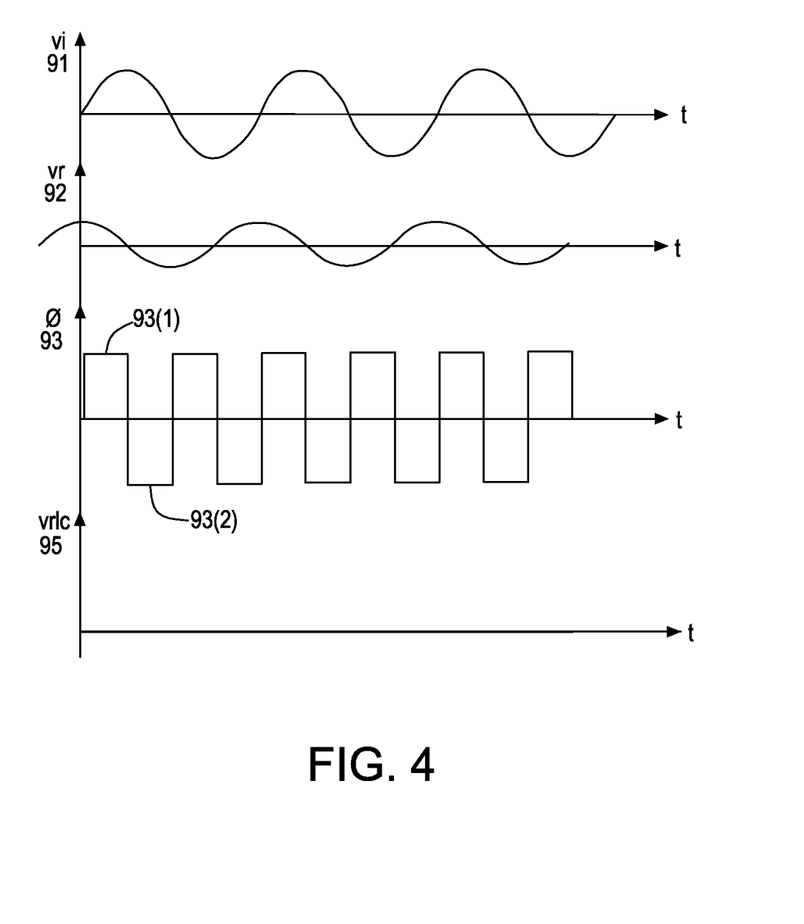
FIG. 4 is timing diagram that shows various signals of the system according to an embodiment of the invention.

FIG. 4 is a timing diagram that illustrates various signals of the system of FIG. 2, according to an embodiment of the invention.

FIG. 4 differs from FIG. 3 by having the phase signal (Φ) 93 positive about half of the time and thus (given a steady state and a very long integration period) the interface module tuning signal (vrlc) 95 does not increase over time.

Figure 5:
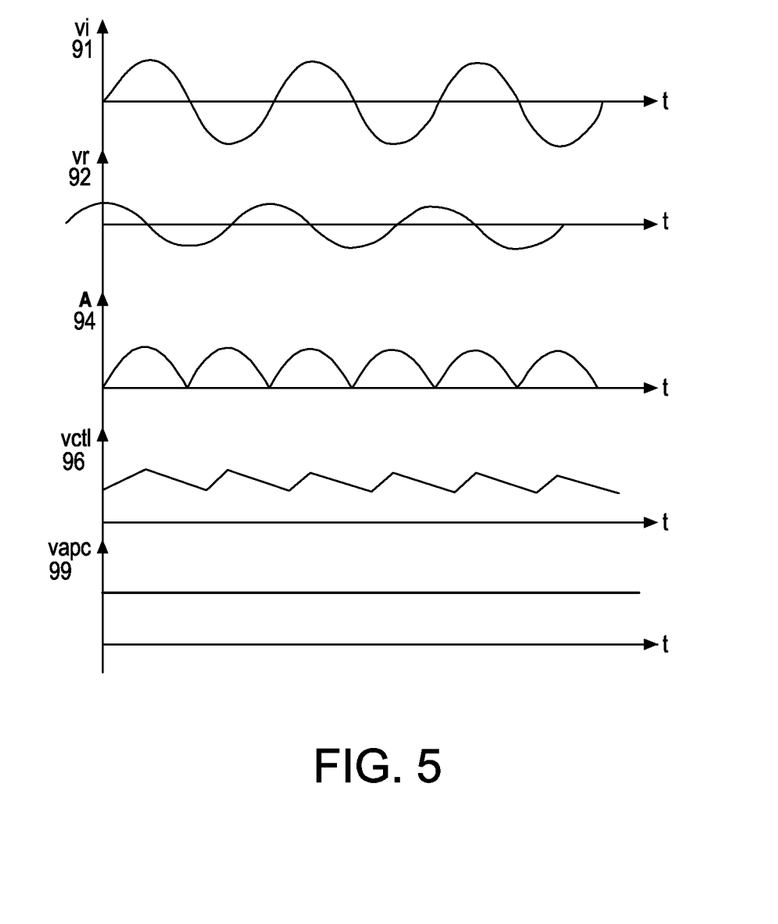
FIG. 5 is timing diagram that shows various signals of the system according to an embodiment of the invention.

FIG. 5 is a timing diagram that illustrates various signals of the system of FIG. 2, according to an embodiment of the invention.

FIG. 5 illustrates first signal (vi) 91 and second signal (vr) 92 as being phase shifted from each other and having a sinusoidal shape.

FIG. 5 also illustrates amplitude signal (A) 94 has having a form that resembles an form of an absolute value of a sinusoidal function.

FIG. 5 further illustrates amplification module tuning signal (vapc) 99, and second control circuit intermediate signals—vctl 96.

FIGS. 6 and 7 illustrate phase and amplitude detectors 70 according to various embodiments of the invention.

In both cases the phase and amplitude detector 70 includes a first piecewise log detector 73, a second piecewise log detector 72 and an output circuit 74 that is connected to the first and second piecewise log detectors.

The output circuit 74 of FIG. 7 includes filters (LPF 74(2) and 74(4)) that are arranged to filter the first and second intermediate signals IS1 and IS2 111 and 112 to provide first and second filtered signals; exponential functions (such $10^x$ functions 74(3) and 74(5)) that are arranged to provide the exponent of the first and second filtered signals to provide two linear signals; an adder (74(6)) that is arranged to add the first and second signals to provide a sum signal; and a logarithmic circuit (74(7)) that is arranged to calculate a logarithm of the sum signal to provide the phase signal. The output signal A provides the information of the detected power level at the input of the detector in a log scale.

The two piece wise logarithmic detector (72 and 73) are arranged to provide the amplitude and phase information that correspond to the output power and impedance mismatch respectively. Both amplitude and phase information are obtained in a single detector structure as indicated in FIGS. 6 and 7. Turning to FIG. 6, amplitude information is derived from the piece wise logarithmic detector comprised of the limiting amplifier 73(1) and the squared functions 73(6). In this ensemble, the resultant signal IS1 111 at the output of the summing unit 73(7) is a piece-wise approximation of the logarithmic function.

To obtain the phase information in FIG. 6, as the amplitude information is not required, one can use the limiting amplification chains 72 and 73 followed by a multiplication unit 74. The limiting amplification chain 72 and 73 are common to amplitude and impedance indicators. In this configuration, a second squared unit 72(6) is used to maintain the symmetric of the arrangement. In other words, the limiting amplifiers 72(1) and 73(1) experience the same load. This is important for the phase information is a measure between the ratio of the sign of the incident and reflected signals (vi and vr).

Although a common limiting amplification unit, 72(1) and 73(1), obtains the amplitude and phase information, there is no correlation between the impedance and amplitude indications. It is then possible to implement two different loop control structures (an amplitude loop and an impedance loop) using a single merged detectors of FIGS. 6 and 7. The difference between FIGS. 6 and 7 is that the amplitude indication at the output of the summing unit 74(7) accounts for the reflected voltage. Considering the amplitude reflected voltage much smaller than the incident voltage, the ensemble of FIG. 7 reduces to the structure of FIG. 6.

The first piecewise detector 73 is arranged to receive the first signal vi and to output (a) a first intermediate signal IS1 111 that provides an approximation of a logarithm of a square of the first signal (vi*vi), and (b) a third intermediate signal IS3 113 that is generated by passing vi via a sequence of limiters 73(1). It includes a sequence of limiters 73(1), the output of each limiter is connected to a square unit ($X^2$) 73(6) that receives a signal and outputs a signal that its value equals to a square of that signal, whereas all the square units are connected to an adder 73(7) that outputs IS1 111.

In FIG. 6 IS1 111 is fed to a low pass filter LPF 74(2) of output circuit 74 that outputs amplitude signal A 94.

In FIG. 7 IS1 111 is fed to LPF 74(2) that outputs a first filtered signal and is followed by a first antilog circuit 74(3) that outputs a first antilog signal that equals ten by a power of the first filtered signal. IS2 112 is fed to LPF 74(4) that outputs a second filtered signal and is followed by a second antilog circuit 74(3) circuit that outputs a second antilog signal. The first and second antilog signals are added to each other (by adder 74(6) of output circuit 74) and the output of adder 74(6) are fed to logarithmic circuit (LOG) 74(7) that outputs amplitude signal A 94.

In both FIGS. 6 and 7 third and fourth intermediate signals IS3 113 and IS4 114 are multiplied by multiplier 74(1) of output circuit 74 to provide phase signal 93.

The second piecewise detector 72 of FIG. 7 is arranged to receive the second signal vr and to output (a) a second intermediate signal IS2 112 that provides an approximation of a logarithm of a square of the second signal (vr*vr), and (b) a forth intermediate signal IS4 114 that is generated by passing vr via a sequence of limiters 72(1)-72(5).

The second piecewise detector 72 includes a sequence of limiters 72(1)-72(5), the output of each limiter is connected to a square unit ($X^2$) 72(6) that receives a signal and outputs a signal that its value equals to a square of that signal, whereas all the square units are connected to an adder 72(7) that outputs IS1 111.

It is noted that the second piecewise detector 72 of FIG. 6 outputs only the fourth intermediate signal IS4 114 and it can be replaced by a single limiter 72(1). Using the configuration of FIG. 6 provides first and second piecewise detectors of the same impedance. Alternatively, the second piecewise detector 72 of FIG. 6 can be replaced by a circuit that has a substantially same impedance as the first piecewise log detector.

The tunable amplification module can be tuned in various manners. One or more parameters of any power amplifier can be tuned and additionally or alternatively, one or more parameter of other components can be tuned.

According to an embodiment of the invention the detector can 700 can be a merged detector as includes an impedance indicative signal circuit (for generating the impedance indicative signal) and a power indicative signal circuit (for generating the power indicative signal)- and the impedance indicative signal circuit and the power indicative signal circuit share multiple components. For example, referring to the example set forth in FIG. 7—both the first and second piecewise detectors 72 and 73 are utilized for generating the impedance indicative signal and the power indicative signal. The impedance indicative signal circuit and the power indicative signal circuit can be included in the same housing and may share a substantially number of components.

The impedance indicative signal is sent to a first loop and the power indicative signal is sent to a second loop; the first and second loops may be are mutually independent. Referring to the example set forth in FIG. 1 the first loop can include first control circuit 121 and interfacing module 45, while the second loop may include the second control circuit 121 and the tunable amplification module 20.

Figure 8:
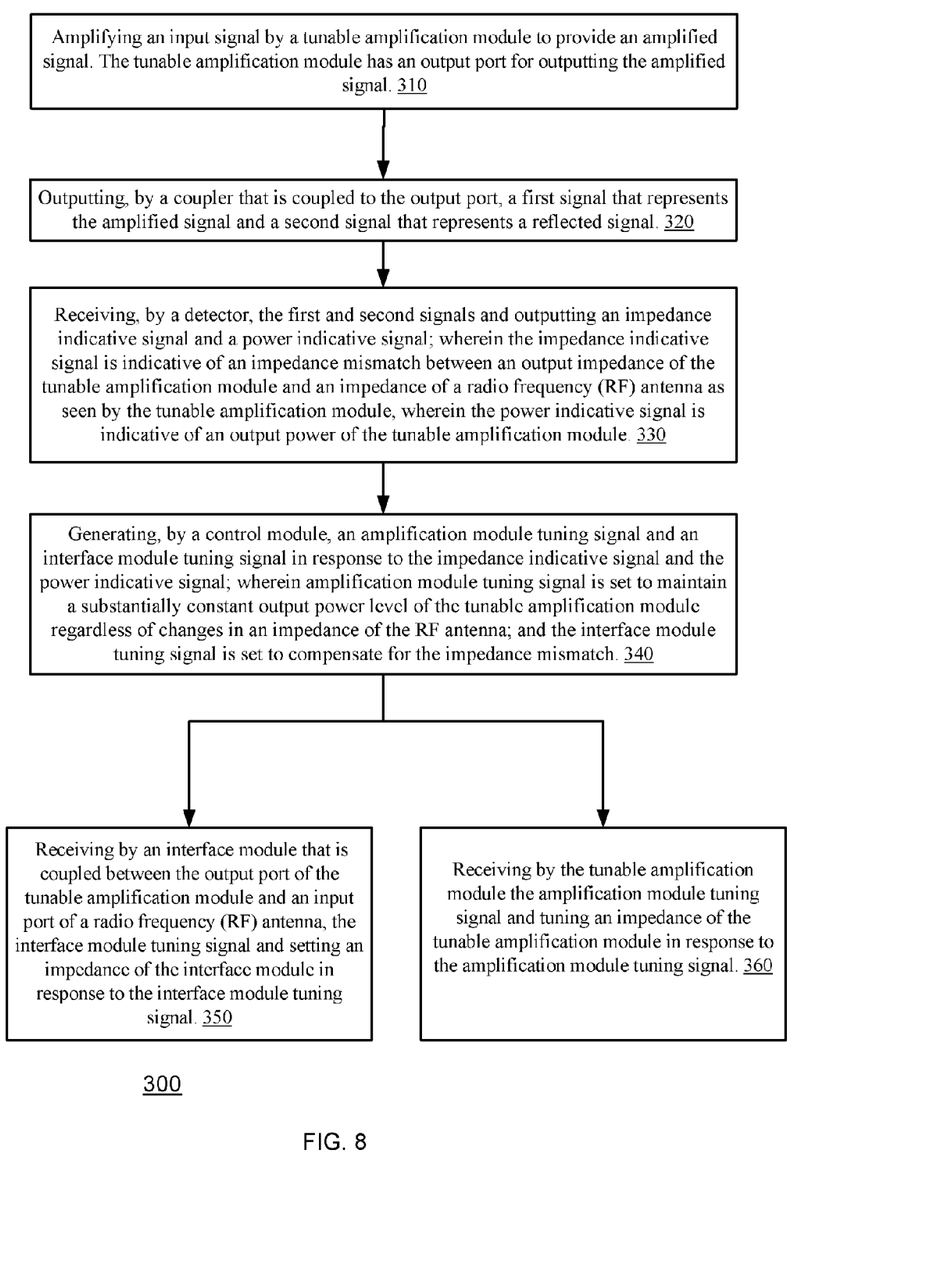
FIG. 8 illustrates a method according to an embodiment of the invention.

FIG. 8 illustrates method 300 according to an embodiment of the invention.

Method 300 may start by stage 310 of amplifying an input signal by a tunable amplification module to provide an amplified signal. The tunable amplification module has an output port for outputting the amplified signal.

Stage 310 may be followed by stage 320 of outputting, by a coupler that is coupled to the output port, a first signal that represents the amplified signal and a second signal that represents a reflected signal.

Stage 320 may be followed by stage 330 of receiving, by a detector, the first and second signals and outputting an impedance indicative signal and a power indicative signal; wherein the impedance indicative signal is indicative of an impedance mismatch between an output impedance of the tunable amplification module and an impedance of a radio frequency (RF) antenna as seen by the tunable amplification module, wherein the power indicative signal is indicative of an output power of the tunable amplification module.

The detector can be a phase and amplitude detector. The impedance indicative signal may be phase signal that is indicative of a phase of the amplified signal. The power indicative signal may be an amplitude signal that is indicative of an amplitude of the amplified signal.

Stage 330 may include generating the phase signal and the amplitude signal. The phase signal can be calculated by an output circuit that receives the output of first and second piecewise log detectors.

Stage 330 may include at least one out of: (a) receiving by the first piecewise detector the first signal, (b) outputting by the first piecewise detector, a first intermediate signal that provides an approximation of a logarithm of a square of the first signal; (c) outputting by the first piecewise detector a third intermediate signal that is generated by passing the first signal via one or more limiters; (d) receiving by the second piecewise detector the second signal; (e) outputting by the second piecewise detector a second intermediate signal that provides an approximation of a logarithm of a square of the second signal; (f) outputting by the second piecewise detector a forth intermediate signal that is generated by passing the second signal via one or more limiters; (g) processing by an output circuit the first and second intermediate signals to provide the amplitude signal; (h) processing by the output circuit the third and fourth intermediate signals to provide the phase signal.

The processing of the first, second, third and fourth intermediate signals by the output circuit may include: (a) filtering the first and second intermediate signals to provide first and second filtered signals; (b) performing antilog operations on the first and second filtered signals to provide first and second antilog signals; (c) adding the first and second antilog signals to provide a sum signal; and (d) calculating a logarithm of the sum signal to provide the phase signal.

Stage 330 may be followed by stage 340 of generating, by a control module, an amplification module tuning signal and an interface module tuning signal in response to the impedance indicative signal and the power indicative signal; wherein amplification module tuning signal is set to maintain a substantially constant output power level of the tunable amplification module regardless of changes in an impedance of the RF antenna; and the interface module tuning signal is set to compensate for the impedance mismatch.

Stage 340 may include generating by a first control circuit the interface module tuning signal in response to the phase signal and generating by a second control circuit the amplification module tuning signal in response to the amplitude signal.

Stage 340 may be followed by stage 350 of receiving by an interface module that is coupled between the output port of the tunable amplification module and an input port of the RF antenna, the interface module tuning signal and setting an impedance of the interface module in response to the interface module tuning signal.

Stage 340 may be followed by stage 360 of receiving by the tunable amplification module the amplification module tuning signal and tuning an impedance of the tunable amplification module in response to the amplification module tuning signal. Stages 350 and 360 may be followed by stage 310.

Method 300 may be executed by any of the systems illustrated above.

Unless specifically stated otherwise, as apparent from the preceding discussions, it is appreciated that, throughout the specification, discussions utilizing terms such as "processing," "computing," "calculating," "determining," or the like, refer to the action and/or processes of a computer, computing system, or similar electronic computing device that manipulates and/or transforms data represented as physical, such as electronic, quantities within the computing system's registers and/or memories into other data similarly represented as physical quantities within the computing system's memories, registers or other such information storage, transmission or display devices.

Embodiments of the present invention may include apparatus for performing the operations herein. This apparatus may be specially constructed for the desired purposes, or it may comprise a general-purpose computer selectively activated or reconfigured by a computer program stored in the computer. Such a computer program may be stored in a computer readable storage medium, such as, but not limited to, any type of disk, including floppy disks, optical disks, magnetic-optical disks, read-only memories (ROMs), compact disc read-only memories (CD-ROMs), random access memories (RAMs), electrically programmable read-only memories (EPROMs), electrically erasable and programmable read only memories (EEPROMs), magnetic or optical cards, Flash memory, or any other type of media suitable for storing electronic instructions and capable of being coupled to a computer system bus.

The processes and displays presented herein are not inherently related to any particular computer or other apparatus. Various general-purpose systems may be used with programs in accordance with the teachings herein, or it may prove convenient to construct a more specialized apparatus to perform the desired method. The desired structure for a variety of these systems will appear from the description below. In addition, embodiments of the present invention are not described with reference to any particular programming language. It will be appreciated that a variety of programming languages may be used to implement the teachings of the invention as described herein.

In the foregoing specification, the invention has been described with reference to specific examples of embodiments of the invention. It will, however, be evident that various modifications and changes may be made therein without departing from the broader spirit and scope of the invention as set forth in the appended claims.

Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

The connections as discussed herein may be any type of connection suitable to transfer signals from or to the respective nodes, units or devices, for example via intermediate devices. Accordingly, unless implied or stated otherwise, the connections may for example be direct connections or indirect connections. The connections may be illustrated or described in reference to being a single connection, a plurality of connections, unidirectional connections, or bidirectional connections. However, different embodiments may vary the implementation of the connections. For example, separate unidirectional connections may be used rather than bidirectional connections and vice versa. Also, plurality of connections may be replaced with a single connection that transfers multiple signals serially or in a time multiplexed manner. Likewise, single connections carrying multiple signals may be separated out into various different connections carrying subsets of these signals. Therefore, many options exist for transferring signals.

Although specific conductivity types or polarity of potentials have been described in the examples, it will be appreciated that conductivity types and polarities of potentials may be reversed.

Each signal described herein may be designed as positive or negative logic. In the case of a negative logic signal, the signal is active low where the logically true state corresponds to a logic level zero. In the case of a positive logic signal, the signal is active high where the logically true state corresponds to a logic level one. Note that any of the signals described herein may be designed as either negative or positive logic signals. Therefore, in alternate embodiments, those signals described as positive logic signals may be implemented as negative logic signals, and those signals described as negative logic signals may be implemented as positive logic signals.

Furthermore, the terms "assert" or "set" and "negate" (or "deassert" or "clear") are used herein when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures may be implemented which achieve the same functionality.

Any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. Alternatively, the examples may be implemented as any number of separate integrated circuits or separate devices interconnected with each other in a suitable manner.

Also for example, the examples, or portions thereof, may implemented as soft or code representations of physical circuitry or of logical representations convertible into physical circuitry, such as in a hardware description language of any appropriate type.

Also, the invention is not limited to physical devices or units implemented in non-programmable hardware but can also be applied in programmable devices or units able to perform the desired device functions by operating in accordance with suitable program code, such as mainframes, minicomputers, servers, workstations, personal computers, notepads, personal digital assistants, electronic games, automotive and other embedded systems, cell phones and various other wireless devices, commonly denoted in this application as 'computer systems'.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements The mere fact that certain measures are recited in mutually different claims does not indicate that a combination of these measures cannot be used to advantage.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

What is claimed is:

1. A system, comprising:
    a tunable amplification module that is arranged to amplify an input signal for providing an incident signal; wherein the tunable amplification module has an output port for outputting the incident signal, an input port for receiving the input signal and a control input for receiving an amplification module tuning signal for tuning the amplification factor of the tunable amplification module;
    a coupler that is arranged to output a first signal that represents the incident signal and a second signal that represents a reflected signal;
    an interface module;
    a detector that is arranged to receive the first and second signals and to output an impedance indicative signal and a power indicative signal; wherein the impedance indicative signal is indicative of an impedance mismatch between an output impedance of the tunable amplification module and an impedance of a radio frequency (RF) antenna as seen by the tunable amplification module, wherein the power indicative signal is indicative of an output power of the tunable amplification module;
    wherein the interface module is arranged to receive an interface module tuning signal and to set an impedance of the interface module in response to the interface module tuning signal; and
    a control module that is arranged to generate the amplification module tuning signal and the interface module tuning signal in response to the impedance indicative signal and the power indicative signal;
    wherein control module is arranged to set the amplification module tuning signal to maintain a substantially constant output power level of the tunable amplification module regardless of changes in an impedance of the RF antenna; and
    wherein the control module is arranged to set the interface module tuning signal to compensate for the impedance mismatch.

2. The system according to claim 1, wherein the control module is arranged to generate the amplification module tuning signal independently from the interface module tuning signal.

3. The system according to claim 1, wherein the control module comprises a first control circuit that is arranged to generate the interface module tuning signal in response to the impedance indicative signal; and a second control circuit that is arranged to generate the amplification module tuning signal in response to the power indicative signal.

4. The system according to claim 3, wherein the first control circuit is an integrator.

5. The system according to claim 3, wherein the second control circuit comprises a low pass filter.

6. The system according to claim 1, wherein the detector comprises an impedance indicative signal circuit and a power indicative signal circuit; wherein the impedance indicative signal circuit and the power indicative signal circuit share multiple components.

7. The system according to claim 1, wherein the impedance indicative signal is sent to a first loop and the power indicative signal is sent to a second loop; wherein the first and second loop are mutually independent.

8. The system according to claim 1 wherein the detector is a phase and amplitude detector; wherein the impedance indicative signal is a phase signal and wherein the power indicative signal is an amplitude signal; wherein the phase signal is indicative of a an imaginary part of the impedance of the radio frequency (RF) antenna and the amplitude signal is indicative of an amplitude of at least the amplified signal.

9. The system according to claim 8, wherein the detector comprises a first piecewise log detector, a second piecewise log detector and an output circuit coupled to the first and second piecewise log detectors.

10. The system according to claim 9, wherein the first piecewise detector is arranged to receive the first signal and to output a first intermediate signal that provides an approximation of a logarithm of the first signal; wherein the second piecewise detector is arranged to receive the second signal and to output a second intermediate signal that provides an approximation of a logarithm of the second signal; wherein the output circuit is arranged to process the first and second intermediate signals to provide the phase signal and the amplitude signal.

11. The system according to claim 9, wherein the first piecewise log detector comprises a first sequence of limiters that is arranged to receive the first signal and to output a third intermediate signal; wherein the second piecewise log detector comprises a second sequence of limiters that is arranged to receive the second signal and to output a fourth intermediate signal; and wherein the output circuit comprises a multiplier that is arranged to multiply the third and fourth intermediate signals to provide the phase signal.

12. The system according to claim 1, wherein the detector comprises a first piecewise log detector, a limiter and an output circuit; wherein the first piecewise log detector is arranged to process the first signal to provide a first and second intermediate signals; wherein the limiter is arranged to receive the second signals and output a fourth intermediate signal; wherein the output circuit is arranged to receive the first, second and fourth intermediate signals and output the signals.

13. The system according to claim 12, wherein the first piecewise log detector comprises a first sequence of limiters that is arranged to receive the first signal and to output a third intermediate signal; and wherein the output circuit comprises a multiplier that is arranged to multiply the third and fourth intermediate signals to provide a phase signal.

14. The system according to claim 1, wherein the detector is arranged to generate the power indicative signal in response to the first and second signals.

15. A method for tuning a system, the method comprises:
amplifying an input signal by a tunable amplification module to provide an incident signal; wherein the tunable amplification module has an output port for outputting the incident signal;
outputting, by a coupler, a first signal that represents the incident signal and a second signal that represents a reflected signal;
receiving, by a detector, the first and second signals and outputting an impedance indicative signal and a power indicative signal; wherein the impedance indicative signal is indicative of an impedance mismatch between an output impedance of the tunable amplification module and an impedance of a radio frequency (RF) antenna as seen by the tunable amplification module, wherein the power indicative signal is indicative of an output power of the tunable amplification module;
generating, by a control module, an amplification module tuning signal and an interface module tuning signal in response to the impedance indicative signal and the power indicative signal; wherein amplification module tuning signal is set to maintain a substantially constant output power level of the tunable amplification module regardless of changes in an impedance of the RF antenna and wherein the interface module tuning signal is set to compensate for the impedance mismatch;
receiving by an interface module the interface module tuning signal and setting an impedance of the interface module in response to the interface module tuning signal; and
receiving by the tunable amplification module the amplification module tuning signal and tuning an amplification factor of the tunable amplification module in response to the amplification module tuning signal.

16. The method according to claim 15 wherein the detector is a phase and amplitude detector; wherein the impedance indicative signal is a phase signal and wherein the power indicative signal is an amplitude signal; wherein the phase signal is indicative of a an imaginary part of the impedance of the radio frequency (RF) antenna and the amplitude signal is indicative of an amplitude of at least the amplified signal.

17. The method according to claim 16, wherein the detector comprises a first piecewise log detector, a second piecewise log detector and an output circuit coupled to the first and second piecewise log detectors.

18. The method according to claim 17, wherein the first piecewise detector is arranged to receive the first signal and to output a first intermediate signal that provides an approximation of a logarithm of the first signal; wherein the second piecewise detector is arranged to receive the second signal and to output a second intermediate signal that provides an approximation of a logarithm of the second signal; wherein the output circuit is arranged to process the first and second intermediate signals to provide the phase signal and the amplitude signal.

19. The method according to claim 17, wherein the first piecewise log detector comprises a first sequence of limiters that is arranged to receive the first signal and to output a third intermediate signal; wherein the second piecewise log detector comprises a second sequence of limiters that is arranged to receive the second signal and to output a fourth intermediate signal; and wherein the output circuit comprises a multiplier that is arranged to multiply the third and fourth intermediate signals to provide the phase signal.

20. The method according to claim 15, wherein the detector comprises a first piecewise log detector, a limiter and an output circuit; wherein the first piecewise log detector is arranged to process the first signal to provide a first and second intermediate signals; wherein the limiter is arranged to receive the second signals and output a fourth intermediate signal; wherein the output circuit is arranged to receive the first, second and fourth intermediate signals and output the signals.

21. The method according to claim 20, wherein the first piecewise log detector comprises a first sequence of limiters that is arranged to receive the first signal and to output a third intermediate signal; and wherein the output circuit comprises a multiplier that is arranged to multiply the third and fourth intermediate signals to provide a phase signal.

* * * * *